July 6, 1965 SHINICHI ISEMURA 3,193,295
VISUAL AND AURAL TYPE SOUND RECORDING AND REPRODUCING DEVICE
Filed Feb. 1, 1963 8 Sheets-Sheet 1

INVENTOR
Shinichi Isemura

BY Pierce, Schiffler & Parker
ATTORNEYS

July 6, 1965  SHINICHI ISEMURA  3,193,295
VISUAL AND AURAL TYPE SOUND RECORDING AND REPRODUCING DEVICE
Filed Feb. 1, 1963  8 Sheets-Sheet 2

INVENTOR
Shinichi Isemura

BY Pierce, Schiffler & Parker
ATTORNEYS

United States Patent Office 3,193,295
Patented July 6, 1965

3,193,295
VISUAL AND AURAL TYPE SOUND RECORDING AND REPRODUCING DEVICE
Shinichi Isemura, Takaoka, Japan, assignor to Daiei Presscorder Company Limited, Tokyo, Japan, a corporation of Japan
Filed Feb. 1, 1963, Ser. No. 255,478
Claims priority, application Japan, Feb. 8, 1962, 37/5,411; Mar. 7, 1962, 37/8,925; May 25, 1962, 37/27,320; Dec. 4, 1962, 37/53,621
18 Claims. (Cl. 274—9)

The present invention relates to a visual and aural type sound recording and reproducing device for effecting a sound recording and reproduction of a stationary and visible record body comprising a record surface and a printed surface and placed at any desired position.

A sound recording and reproducing record body having spiral sound tracks such as a record surface having spiral sound tracks or a magnetic record surface covered with a magnetic film having spiral sound tracks has heretofore been most commonly used. In order to effect the sound recording and reproduction of such record body, a record body having a center hole is placed on a turn table having a center shaft and rotated together with the turn table, while a sound reproducing stylus fitted at the end of a pickup arm pivoted at a base plate exterior to the rotating disc or a magnetic head is made to trace along the sound track on the record surface, thereby effecting the sound reproduction of the record body.

The above mentioned conventional sound recording and reproducing device has disadvantages that during the sound reproduction the record surface could not visually be observed since the record surface rotates during its sound reproduction, and that the record body could not be placed at any desired position such as at a vertical position.

The object of the invention is to provide a sound recording and reproducing device adapted to effect a sound recording and reproduction using a stationary record body provided at each side surface or at one surface with a record surface and a printed surface.

For a better understanding of the invention, reference is taken to the accompanying drawings, of which;

FIGS. 9A and 9B are perspective views for illustrating the manner of applying the device according to the invention to a record surface fixed on the vertical wall and a record surface formed on pages of a book;

FIGS. 11A, 11B and 11C are perspective views showing various shapes of the record body according to the invention;

Figure 1:
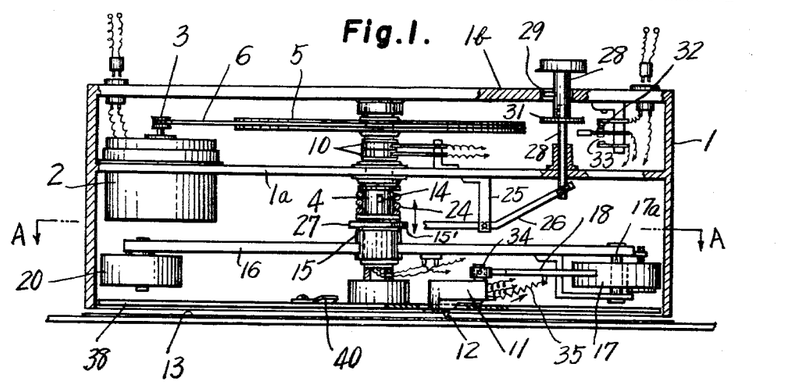
FIG. 1 is a longitudinal sectional view of a device embodying the invention.
Figures 7, 8, 9:
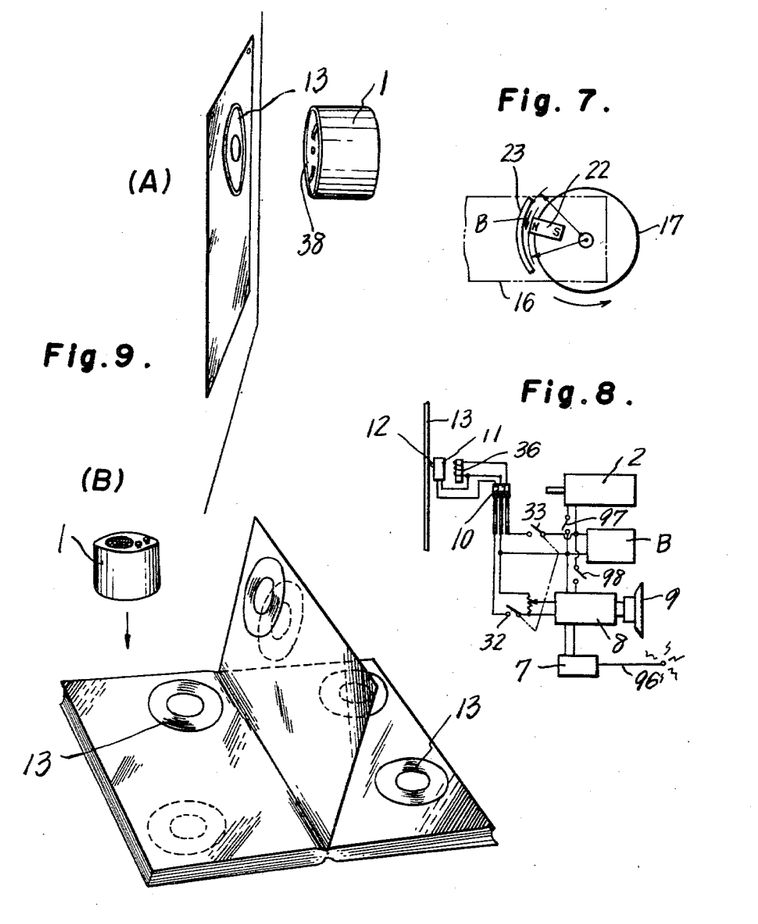
FIG. 7 is a partial view showing means for balancing the inside force acting upon the pickup arm end during scanning.
FIG. 8 is an electric circuit diagram for the device according to the invention.

Referring to FIG. 1, 1 represents a cylindrical casing enclosing a device according to the invention, 1a a partition wall, 2 a motor, 3 a driving pulley, 4 a main shaft rotatably journalled at the center of the casing 1, 5 a driven pulley secured to the main shaft 4, and 6 a belt in engagement with the pulleys 3 and 5. In FIG. 8, B shows a battery, 7 an oscillator, 8 an amplifier, 9 a speaker, 10 a collector ring, 11 a cartridge, 12 a stylus and 13 a record surface.

In accordance with the invention, the main shaft 4 is provided with a key 14 and a sleeve 15 slidably fitted around the main shaft 4 by means of the key 14. To the sleeve 15 is secured a rotatable base plate 16 perpendicular to the main shaft 4. A weight 17 is rotatably pivoted to one end of the base plate 16 and a pickup arm 18 is projected from one side of the weight 17. The weight 17 is provided at the opposite side with an auxiliary weight 19 (FIG. 2) which serves to balance the mass of the pickup arm 18 with respect to the axis of the weight 17. To the other end of the rotatable base plate 16 is secured a balancing weight 20 which serves to balance the mass of the side portion of the rotatable base plate 16 including the rotatable weight 17 and pickup arm 18 with respect to the axis of the main shaft 4. These rotating bodies are so constructed that they always occupy a balanced state during rotation at any desired position.

The stylus 12 secured to the end of the pickup arm 18 is brought into contact with sound tracks formed on the record surface 13 and is rotated. The pickup arm 18 is subjected to an inside force during rotation owing to its overhanging action of the stylus 12. This inside force interferes with a satisfactory sound recording and reproduction of the pickup arm 18. In accordance with the invention, in order to cancel this inside force use is made of a spring or magnetic force to obtain a rotating force for rotating the pickup arm 18 in a direction opposite to that of the inside force.

Figure 2:
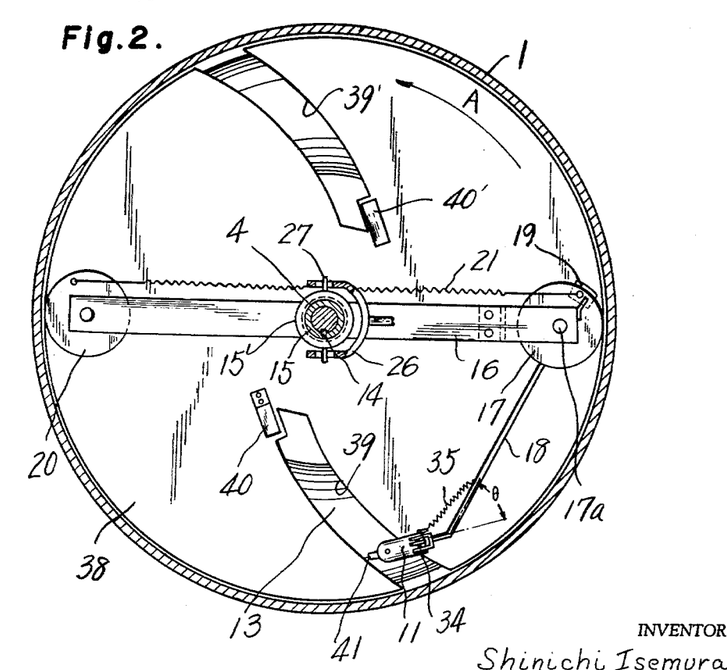
FIG. 2 is a cross section on the line A—A of FIG. 1.
Figure 3:
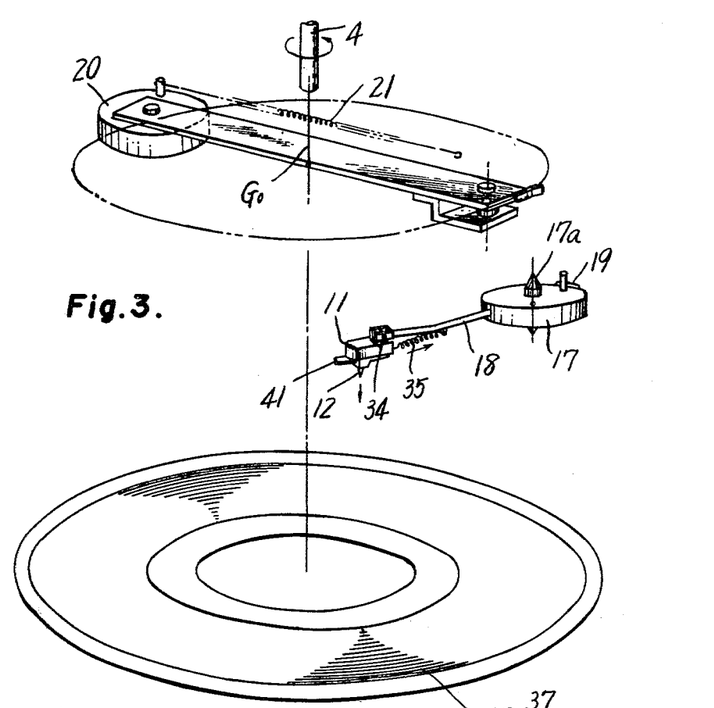
FIG. 3 is a perspective view showing a balanced rotatable scanning means according to the invention and also a record surface placed in opposition to the scanning means.

In an example shown in FIGS. 2 and 3, a spring 21 is connected between the rotatable weight 17 and the stationary weight 20 in order to cancel the inside force. In another example shown in FIG. 7 a magnetic force is applied to the rotatable weight 17 in order to cancel the inside force. 22 represents a magnet secured to the outer periphery of the rotatable weight 17 and 23 is a curved iron piece secured to the base place 16 in opposition to the magnet 22. The gap between the curved iron piece 23 and the magnet 22 is so formed that it gradually becomes small towards in a counter clockwise direction.

Figure 4:
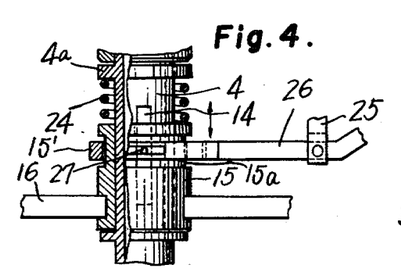
FIG. 4 is a side view partly in section of a mechanism for displacing a rotating main shaft for supporting the scanning means.
Figure 5:
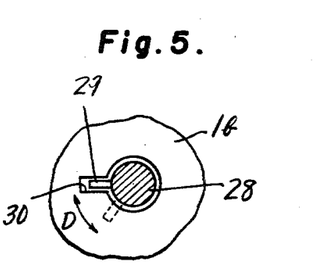
FIG. 5 is a plan view showing a relation between a push rod for operating the displacing mechanism shown in FIG. 4 and a casing of the device.
Figure 6:
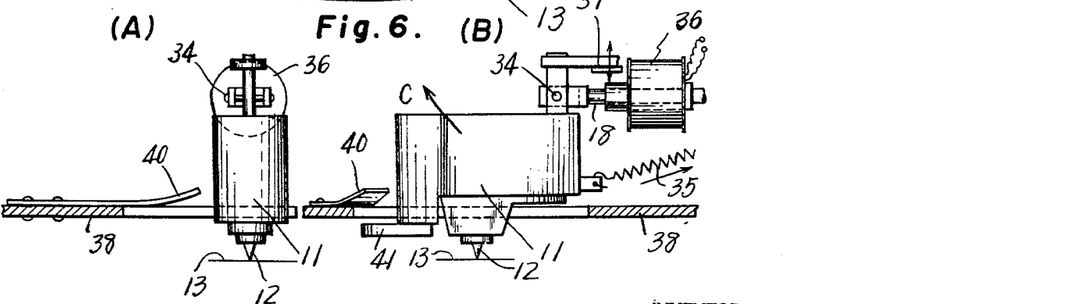
FIG. 6A is a front elevation showing a sound recording and reproducing cartridge.
FIG. 6B is its side view.

In accordance with the invention, a spring 24 is inserted between a flange 4a of the main shaft 4 and the sleeve 15 (FIG. 4). The spring 24 always acts to push the sleeve 15 towards the record surface. Provision is made of a lever 26 pivoted at its center part by a bracket 25 secured to the partition wall 1a of the casing 1 and one end of the lever 26 is brought into engagement with a pin 27 projected from a ring 15' loosely fitted in a slot 15a formed on the sleeve 15, while the other end of the lever 26 is operatively connected to the lower end of a push rod 28 slidably inserted in the casing from the upper surface thereof (FIG. 1). The push rod 28 is provided with a pin 29 projected from a portion extending through an upper wall 1b of the casing. The upper wall 1b of the casing is formed with a notch 30 (FIG. 5) in which the pin 29 engages. The push rod 28 is also provided with an engaging plate 31 secured thereto. Provision is made of contacts 32 which make engagement with the engaging plate 31 when the push rod 28 is pushed downwards to open a sound recording and reproducing circuit and of contact 33 which make engagement with the engaging plate 31 when the push rod 28 is pushed downwards to close an electromagnetic circuit for operating the cartridge. The cartridge 11 is pivoted at the end of the pickup arm 18 by a pin 34 such that the cartridge 11 can be rotatable for a given angle. The cartridge 11 and the pickup arm 18 are interconnected by a spring 35 which always acts to press the cartridge 11 against the record surface 13. An electromagnet 36 is mounted to the pickup arm 18 as shown in FIG. 6B and when energized it can attract an iron piece 37 formed integrally with the cartridge 11 against the action of the spring 35. 38 designates a rotatable disc, 39 a curved groove formed in coincidence with loci traced by the end of the cartridge 11 (FIG. 2), 39' another curved groove symmetrically located with respect to the curved groove 39 for the purpose of balancing the rotating disc 38. A curved plate spring 40 is secured to the disc 38 near the inner end of the curved groove 39 and a tongue 41 is projected from the end of the cartridge 11. If the tongue 41 is pressed into the plate spring 40 the cartridge 11 together with the pickup arm 18 can be locked in position. In FIG. 2, 40' shows a weight for balancing the plate spring 40.

Figures 10, 11:
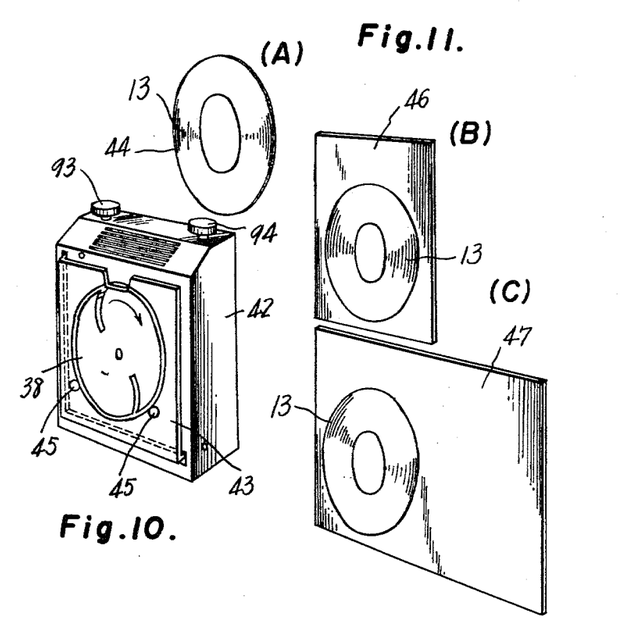
FIG. 10 is a perspective view of a modified embodiment of the invention encased in a vertical rectangular casing.

FIG. 10 shows a vertical rectangular casing 42 for enclosing the device according to the invention. The casing 42 is provided at its front surface with the rotatable disc 38. A transparent plate 43 is secured to the casing 42 to form a small gap between the disc 38 and the plate 43. The plate 43 is made at its upper edge and right side edge open. Various shaped record bodies shown in FIGS. 11A–11C can freely be inserted behind the plate 43 from its upper and right side openings. If it is desired to insert a disc-shaped record body 44 shown in FIG. 11A behind the plate 43, provision is made of pins 45 projected from the front wall of the casing 42 for the purpose of supporting such record body 44 and centering it with the scanning means. If the rectangular shaped record bodies 46 and 47 shown in FIGS. 11B and 11C are inserted behind the plate 43, one side edge and base edge of the record bodies 46 and 47 are brought into contact with corresponding edges of the plate 43, thereby centering the record surface 13 with the scanning means.

Figure 12:
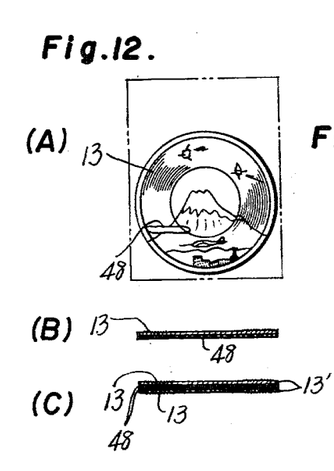
FIG. 12A is a plan view of a record body having at each side a record surface and a printed surface.
FIG. 12B is its sectional view.
FIG. 12C is a sectional view of a modified record body.
Figure 13:
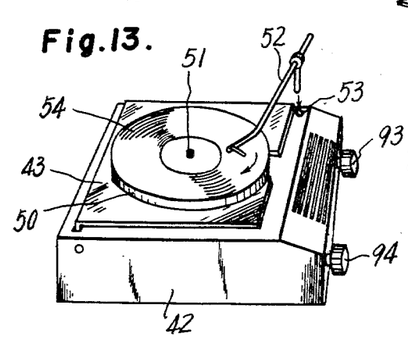
FIG. 13 is a perspective view showing the manner of using the device according to the invention as a conventional record player.
Figure 14:
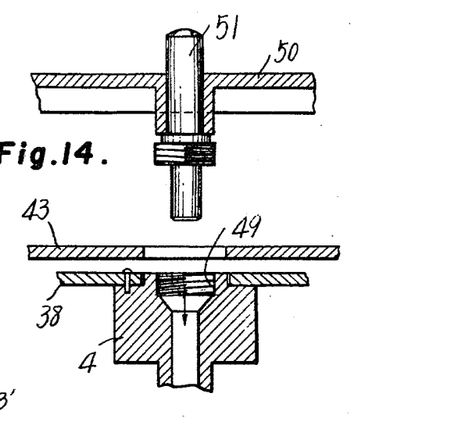
FIG. 14 is a longitudinal sectional view showing a part for interconnecting a turn table of the conventional record player to the device according to the invention.

These record bodies are provided at the back surface thereof with a printed surface 48 as shown in FIGS. 12A and 12B. Since the plate 43 is made transparent, it is possible to visually observe the printed surface 48 during the sound reproduction of the record surface 13. Particularly, use is made of a broad record body such as the rectangular record body shown in FIG. 11C its blank portion can fully be utilized as the printed surface. If a layer 13' inclusive of the record surface 13 is made transparent and adhered to the printed surface 48 to form a laminated sheet and then two such laminated sheets can be adhered together, which makes it possible to see the printed surfaces 48 through the transparent record surface 13 as shown in FIG. 12C. The device according to the invention shown in FIG. 10 can be used as a conventional record player as shown in FIG. 13. In such case, the main shaft 4 is formed at its end with a female tapped hole 49 (FIG. 14) with which a center shaft 51 of a conventional turn table 50 is threadedly engaged. 52 shows a conventional pickup arm fittted at its one end in a hole 53 formed at one corner of the casing 42 and 54 is a conventional record (FIG. 13).

Figure 15:
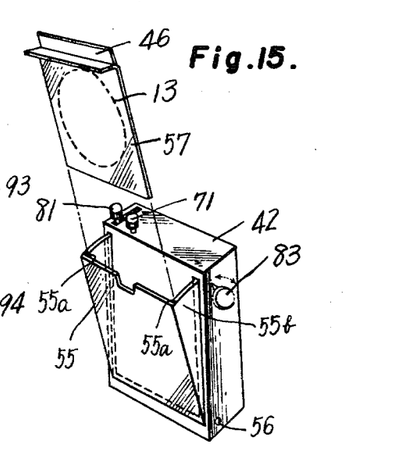
FIG. 15 is a perspective view showing a device according to the invention having a plate for holding a record body inserted behind it.

FIG. 15 shows a modified plate 55 for holding the record body pivoted at its lower end to the casing 42 by a pin 56 and freely rockable to open and closed positions with a given angle. 57 is a plate for carrying and guiding the record body 46. The plate 57 together with the record body 46 are inserted behind the plate 55 through a guiding slot 55a and then the plate 55 is closed to bring the record surface 13 into contact with the scanning means.

Figure 16:
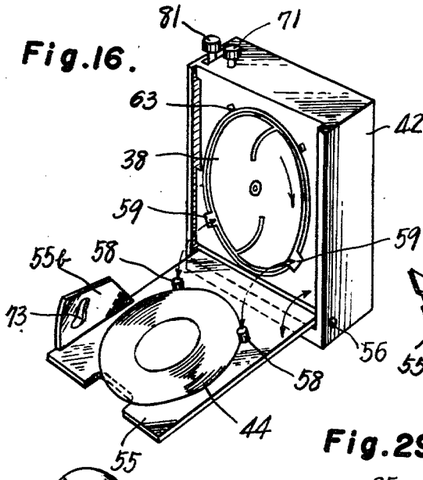
FIG. 16 is a perspective view of the device shown in FIG. 15 showing a front surface of the scanning means and the holding plate in its open position.
Figure 17:
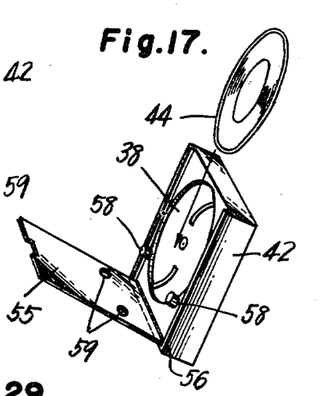
FIG. 17 is a perspective view showing a modified means for supporting records.
Figures 18, 19, 20, 21, 22:
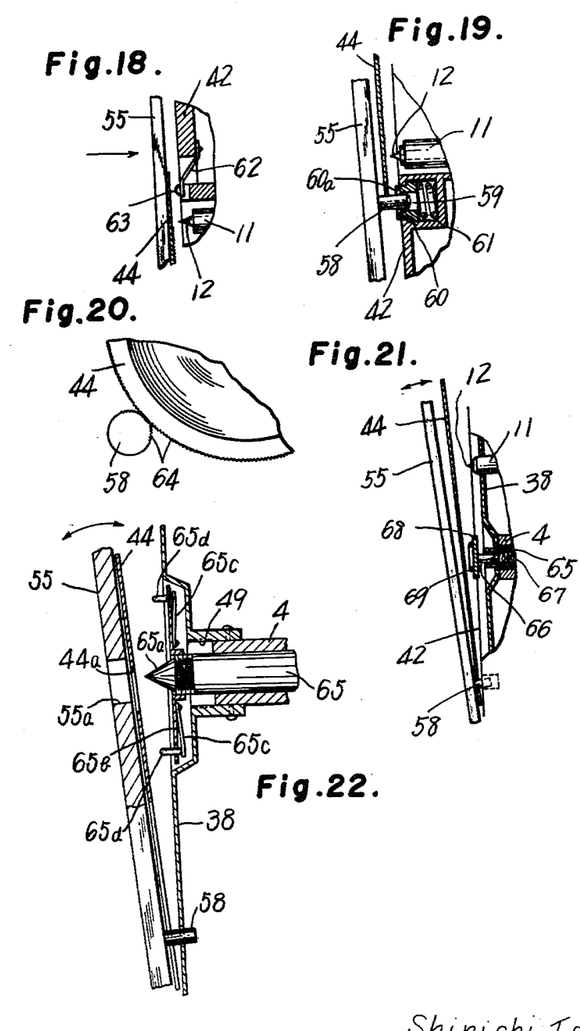
FIGS. 18 to 21 are partial views showing various means for locking the record body.
FIG. 22 is a sectional view of means for effecting fine centering the record body with the scanning means.

If use is made of a disc shaped record body 44 shown in FIGS. 16 and 17, it is supported by pins 58 projected from the rear wall of the plate 55 or from the front wall of the casing 42. 59 are holes into which the pins 58 are inserted. As shown in FIG. 19, the hole 59 may be formed in a short sleeve 60 which is slidable for a given distance and normally pressed outwards by a spring 61. When the record body 44 is held behind the holding plate 55 the outer periphery of the record body 44 is pressed by a step 60a formed at the end of the short sleeve 60 against the holding plate 55 to lock the record body 44. The casing 42 is provided at its front surface corresponding to the upper periphery of the record body 44 with a plate spring 62 having at its free end a resilient contact 63 made of rubber etc., thereby locking the upper periphery of the record body 44 under pressure. FIG. 20 shows another locking means for preventing the record body 44 from becoming rotative. The outer peripheries of the pin 58 and of the record body 44 are formed with saw tooth like indentations 64.

Alternately, in FIG. 21 a stationary shaft 65 is inserted into the center hole of the main shaft 4 and an axially slidable shaft 66 is inserted into the center hole of the stationary shaft 65. The shaft 66 is normally pressed outwards by means of a spring 67. To the end of the shaft 66 is secured an end plate 68 for pressing the record body 44 against the plate 55. The end plate 68 is provided at its front surface with a resilient contact 69. When the plate 55 is closed the contact 69 serves to lock the center part of the record body 44 in position.

FIG. 22 shows an example of means for finely centering a disc shaped record body 44 having a center hole 44a with the scanning means. The main shaft 4 is provided in it with a stationary shaft 65 and its end 65a is made conical and the holding plate 55 is formed with a center hole 55a in a position corresponding to the front conical end 65a. 65b is an end plate threadedly engaged with a step of the stationary shaft 65, 65c a plate spring secured at one end to the rear surface of the end plate 65b, 65d pins projected from the free end of the plate spring 65c and extending through the end plate 65b. When the holding plate 55 is closed the pins 65d push the center part of the record body 44 to lock it. When the holding plate 55 is opened the pins 65d serve to push out the record body 44 from the conical end 65a of the stationary shaft 65.

Figure 23:
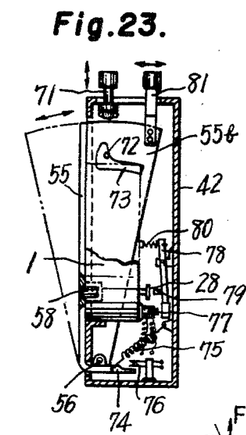
FIG. 23 is a side view partly in section showing means for opening and closing the holding plate.
Figure 24:
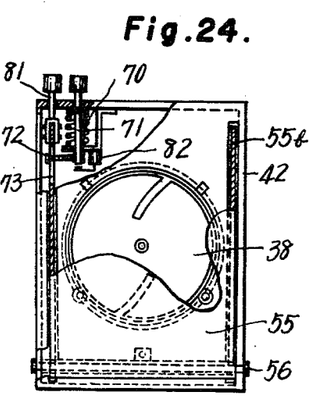
FIG. 24 is its front elevation.
Figure 25:
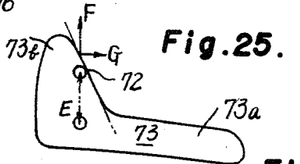
FIG. 25 shows an essential part of the device shown in FIG. 23 in detail.

FIGS. 23–25 show one example of means for opening and closing the plate 55. This means comprises a spring 70 arranged at the upper side part of the casing 42 and a sliding rod 71 adapted to be normally pushed upwards by means of the spring 70. The sliding rod 71 is provided at its lower end with a pin 72 projected sidewards therefrom. The side plate 55b of the holding plate 55 is formed with a L-shaped slot 73 having a horizontal slot portion 73a and a vertical slot portion 73b. The pin 72 is extended through the slot 73. The pivot part of the holding plate 55 is projected into the casing 42 to form a projected arm 74 which is connected to the casing 42 by means of a spring 75 normally biasing the holding plate 55 into its open position. If the holding plate 55 is closed against the action of the spring 75, the pin 72 passes over the horizontal slot portion 73a and arrives at the inclined surface of the vertical slot portion 73b. Then, the spring 70 acts by its upward spring force to resiliently and automatically lock the holding plate 55. If the sliding rod 71 is pushed downwards against the action of the spring 70, the pin 72 comes out of the vertical slot portion 73b and the holding plate 55 is automatically opened by the action of the spring 75. Provision is made of contacts 76 adapted to be closed by the free end of the projection 74 when the holding plate 55 is opened. If the contacts 76 are closed an electromagnet 77 is energized to push in the above mentioned push rod 28, thereby separating the scanning means from the record body. 78 designates a rocking lever, 79 a pin projected from the lever 78 and acting upon the push rod 28, 80 a spring, 81 a manipulating rod secured to the side plate 55b, and 82 a switch adapted to be operated by the sliding rod 71 when it is pushed down in case of opening the holding plate to open an electric supply circuit for the sound recording and reproduction.

Figure 26:
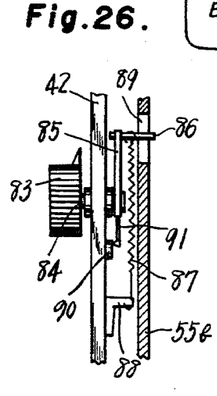
FIG. 26 is a side view partly in section showing a modified means for opening and closing the holding plate.
Figure 27:
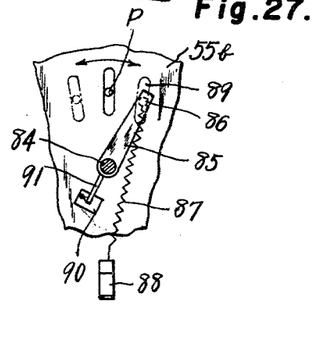
FIG. 27 is its front elevation.

FIGS. 26 and 27 show another example of means for opening and closing the holding plate. In this example, provision is made of a shaft 84 extending through the side wall of the casing 42 and having a knob 83 secured to its outer end. To the inner end of the shaft 84 is secured a lever 85 having at its free end a pin 86. Provision is made of a spring 87 having one end connected to the pin 86, the other end of the spring 87 being connected to a metal fitting 88 secured to the side wall of the casing below the shaft 84. The side plate 55b of the holding plate 55 is provided with an elongated hole 89 in which the pin 86 is loosely engaged. If the knob 83 is rotated to rock the lever 85 to the left or right with respect to a dead point for a line acting upon the spring 87, the holding plate 55 can automatically be set to the open or closed position by the action of the spring 87. 90 shows a switch adapted to be engaged with a pin 91 projected from the lever 85 and close an electric supply circuit for the sound recording and reproduction when the lever 85 is rotated to the position for closing the holding plate 55.

Figure 28:
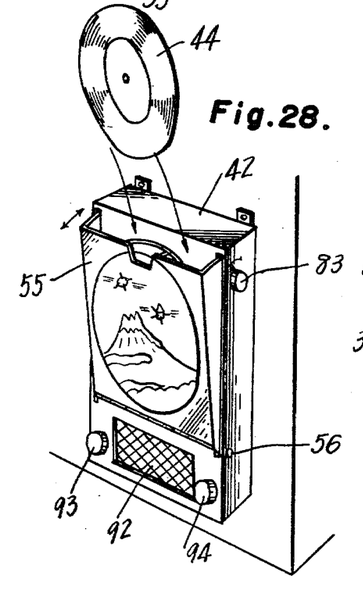
FIG. 28 is a perspective view showing a wall hanging type device according to the invention.
Figure 29:
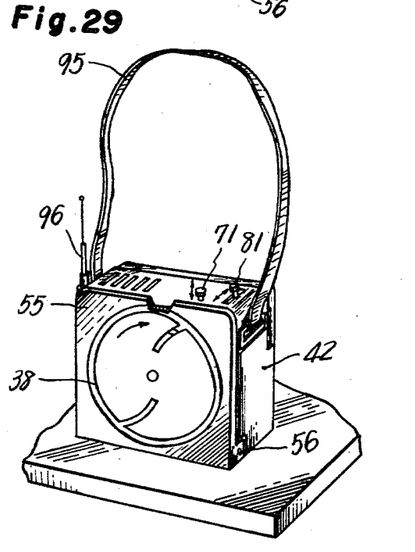
FIG. 29 is a perspective view of a portable type device according to the invention.

FIG. 28 shows a wall hanging type device according to the invention and FIG. 29 shows a portable type device according to the invention. In the embodiments, 92 shows a window for a speaker enclosed in the casing 42, 93, 94 knobs for adjusting the sound recording and reproducing device, 95 a suspending band, and 96 an antenna.

The above mentioned device according to the invention operates as follows:

In the electric circuit shown in FIG. 8, provision is made of a switch 97 connected in a motor circuit and of a switch 98 connected in an amplifier circuit. If these switches 97 and 98 are closed, the motor 2 is energized to rotate the main shaft 4 in a direction shown by an arrow A (FIG. 2) through the pulley 3, belt 6 and the pulley 5. Rotation of the main shaft 4 causes rotation of the base plate 16 through the key 14 and the sleeve 15 and also rotation of the disc 38 secured to the main shaft 4. Consequently, the pickup arm 18 journalled to the base plate 16, the cartridge 11 and the stylus 12 are also caused to be rotated. The stylus 12 always occupies the outside position by the action of the spring 21 before rotation. If the stylus 12 is brought into contact with the record surface 13, the stylus 12 moves along the spiral sound tracks gradually from the outside towards inside. The pickup arm 18 in the position shown in FIG. 2 is acted upon by the inside force and tends to trace the spiral sound tracks, this inside force being cancelled by the tension of the spring 21.

Alternately, the means shown in FIG. 7 may be used instead of the spring 21. The magnet 22 gradually approaches to the curved iron piece 23, so that the inside force can be cancelled by the force tending to rotate in a direction shown by the arrow B. The mass of this pickup arm 18 is balanced with respect to the pivot 17a and the mass of the rotating weight 17 is far greater than that of the pickup arm 18 and the rotating weight 17 is in a complete balance with respect to the pivot 17a. Moreover, the stationary weight 20 provided at the other side of the base plate 16 is completely in balance with respect to the center of the main shaft 4. Thus, the device according to the invention renders it possible to effect a complete sound reproduction for the record body even though its record surface is placed at any desired inclined position. Thus, the device according to the invention can be used in various purposes which has heretofore not been possible by the conventional device and the record surface can easily be appreciated visually and aurally.

The contacts 32 shown in FIGS. 1 and 8 are normally closed contacts connected in the sound recording and reproducing circuit. While the stylus 12 traces the record surface 13 the electric signal from the cartridge 11 is supplied through the collector ring 10 and contacts 32 to the amplifier 8 where it is amplified and then supplied to the speaker 9, thereby delivering sound. After completion of the sound recording and reproduction the press rod 28 is pressed down against the action of the spring 24, then the lever 26 permits to move the scanning means upwardly through the ring 15' and sleeve 15. Thus, the stylus 12 is separated from the record surface 13. If the stylus 12 comes out of the sound tracks, the end of the pickup arm 18 is moved automatically back to the outer periphery of the sound tracks by the action of the spring 21 or the magnet 22.

In the device for electrically separating the scanning means from the record surface, if the press rod 28 is pressed down the engaging plate 31 comes into contact with the contacts 32 to open them, while the contacts 33 are closed to open the sound recording and reproducing circuit and to energize the electromagnet 36. Thus, the iron piece 37 shown in FIG. 6B is attracted, the cartridge 11 is caused to rotate around the pin 34 in a direction shown by an arrow C, thereby separating the stylus 12 from the record surface 13. If the press rod 28 in its depressed position is caused to be rotated in directions shown by arrows D in FIG. 5, the pin 29 comes into engagement with the upper plate 16 of the casing. Thus, the press rod 28 could not be returned to its original position.

If it is desired to lock the device according to the invention for the purpose of its transportation or stock, the cartridge 11 is pushed inwards by a finger end to insert the tongue 41 into a space formed between the curved plate spring 40 and the disc 38, thereby locking the scanning device.

The device according to the invention enclosed in the cylindrical casing 1 as above mentioned may be applied to a record surface 13 fixed to a vertical wall so as to effect sound recording and reproduction of the record surface 13 as shown in FIG. 9A. The device encased in the cylindrical casing 1 may also be placed on the record surface 13 formed on each page of a book as shown in FIG. 9B to aurally hear the sound delivered from the record surface 13 while visually reading the printed page.

FIG. 10 shows a device according to the invention encased in a vertical rectangular casing 42. Various shaped record bodies shown in FIGS. 11 and 12 can be inserted behind the holding plate 43. For example, the disc shaped record body 44 can be supported by the two pins 45 and the base edge and one of the side edges of each rectangular record body 46 or 47 are brought into close contact with two edges of the holding plate 43 such that centering of the record surface 13 of each record body with the scanning device can easily be effected. Since the holding plate 43 is transparent, it is possible to visually observe the printed surface 13 of the record body inserted behind the holding plate 32 provided the use is made of the record body such as shown in FIG. 12, which permits simultaneously the visual and aural appreciation of the record body in more efficient manner.

The vertical rectangular type device shown in FIG. 10 may be turned and placed in a horizontal position as shown in FIG. 13. Such horizontal type device may be combined with a conventional turn table 50 of a conventional record player and with a conventional pickup arm 52 and a sound recording and reproduction of a conventional disc shaped record 54 can easily be effected.

In the vertical type casing 42, the holding plate 55 is made operable into open and closed positions. If the holding plate 55 is closed and the sliding rod 71 is pushed downwards, then the pin 72 moves downwards in the slot 73 in a direction shown by an arrow E in FIG. 25 to release the holding plate 55. Thus, the holding plate 55 is rotated around the pin 56 by the action of the spring 75 to open the upper end of the holding plate 55 from the casing 42. On the other hand, the pin 74 which is integral with the holding plate 55 operates in response to the opening movement of the holding plate 55 to close the contacts 76, thereby energizing the electromagnet 77. The electromagnet 77 attracts the lever 78 which presses down the press rod 28 to separate the scanning device from the record surface. If the sliding rod 71 is pressed downwards it also operates to open the switch 82 connected in the electric supply circuit for the sound recording and reproduction. If the record body is inserted behind the holding plate 55 and then the holding plate 55 is closed against the action of the spring 75, the pin 72 moves out of the horizontal slot portion 73a and comes into engagement with the vertical slot portion 73b. Thus, the pin 72 is pulled up by the action of the spring 70, so that the holding plate 55 is pressed against the front wall of the casing 42 by the horizontal component force G of the lifting force F acting against the inclined surface of the vertical slot portion 73b. Thus, the record body 44 is pressed between the holding plate 55 and the front wall of the casing and ready for the sound recording and reproduction. If the holding plate 55 is rotated to its closed position, the pin 74 causes to open the contacts 76, thereby deenergizing the electromagnet 77. Thus, the lever 78 is released and restored to its original position by the action of the spring 80. The press rod 28 is also restored to its original position, thereby setting the scanning means to its sound recording and reproducing position. When the sliding rod 71 is lifted, it operates to close the switch 82 connected in the sound recording and reproducing circuit, thereby starting the sound reproduction. If the sliding rod 71 is pressed down after the sound reproduction has been completed, the holding plate 55 is opened while the scanning means is separated from the record body to open the switch 82, thereby bringing the sound reproducing device into a rest condition as above mentioned.

FIGS. 26 and 27 show another embodiment of means for opening and closing the holding plate. In this embodiment, if the lever 85 occupies a position shown in FIG. 27 the holding plate 55 is pressed through the pin 86 and the elongated hole 89 against the casing. At the same time, the switch 90 connected in the electric supply circuit for the sound recording and reproduction is closed by the pin 91. If the knob 83 is rotated in a counter clockwise direction, the pin 86 is also caused to rotate in the same direction, thereby gradually opening the holding plate 55. If the pin 86 passes over the dead point P the lever 85 is caused to automatically rotate in the counter clockwise direction, thereby bringing the holding plate 55 into its fully open position. In this position, the pin 91 is separated from the switch 90 to open the switch 90 and set the sound recording and reproducing device to its rest position. If the knob 83 is caused to rotate in a clockwise direction and the pin 86 passes over the dead point P, the lever 85 is caused to rotate automatically in the clockwise direction by means of the spring 87, thereby bringing the holding plate 55 resiliently into its fully closed position. If the holding plate 55 is fully closed, the switch 91 is closed to supply current to the sound recording and reproducing device as above mentioned.

The record body 44 pressed by the holding plate 55 can be made stationary by means of the force produced from the means for opening and closing the holding plate. It is preferable, however, to provide various means for positively locking the record body which is liable to be moved owing to the scanning movement of the stylus 12 in contact with the record surface. Such means are shown in FIGS. 18–22. FIG. 18 shows means for pressing the contact 63 secured to the end of the plate spring 62 against the outer periphery of the record body 44 by means of the spring action of the plate spring 62. Since the contact 63 is made of a resilient material such as rubber etc. it is flexible and has a large frictional resistance and renders it possible to positively lock the record body 44 in the stationary state. FIG. 19 shows another means for pressing the shoulder 60a formed on the short sleeve 60 against the outer periphery of the record body 44 by means of the spring 61. If the outer peripheral end surfaces of both the pin 58 and the record body 44 are formed with saw tooth shaped indentations 64 and both indentations are brought into threaded engagement with each other, which prevents the record body 44 from becoming rotatable. FIG. 21 shows further means for preventing the record body 44 from becoming movable by pressing the contact 69 having a relatively large contact surface against the center part having no sound tracks of the record body 44.

FIG. 22 shows means for accurately centering a disc shaped record body 44 having a center hole 44a. The relative position between the outer periphery and the center of a number of disc shaped record bodies 44 are not always equal and there exists some misalignment. Thus, the center of each record body having the peripheral edge supported by the pin 58 is not accurately coincident with that of another record body having the peripheral edge also supported by the pin 58. The present means renders it possible to a centering of the record body 44 with the scanning means in an easy and accurate manner. The center hole 44a of the record body 44 supported by the pin 58 is made slightly lower than the center hole 55a of the holding plate 55. If the holding plate 55 is closed, the conical end 65a of the center axis 65 is inserted into the center hole 44a and the inclined surface of the conical end 65a serves to effect a fine centering of the record body 44 with the scanning device. When the conical end 65a is closely fitted in the center hole 44a, the record body 44 is accurately set. In this case, the pins 65d serve to push the center part without sound tracks of the record body 44 against the holding plate 55, thereby locking the record body 44. If the holding plate 55 is opened, the center hole 44a can easily be slipped out of the conical end 65a of the center shaft 65, while the record body 44 is pushed out of the center shaft 65 by the pins 65d. Thus, the present means does not make the device as a whole troublesome in its operation.

As above mentioned, the present invention makes it possible to effect the sound recording and reproduction for stationary spiral sound tracks formed on any sloped record surface or on a thin delicate sheet record surface contrary to the conventional device. In the conventional device, a record body having a center hole is caused to rotate together with a turn table, while in the invention the record body is made stationary by locking its center part or its outer periphery. The advantages of the present invention lie in that the record surface formed on any sheet of paper affixed to any inclined surface or that formed on each page of a book as shown in FIG. 9 can be sound reproduced and aurally heard while at the same time any printed surface positioned on or near the record surface can visually be read, which results in a possible manufacture of a visual and aural sheet and magazine, that said sound recording and reproduction can be effected by inserting the record body behind the holding plate in a simple and easy manner; that if the device is hung on a vertical wall as shown in FIG. 28 sound reproduction of the record body can be effected by an extremely easy manipulation while at the same time the printed surface can be visually seen while aurally hearing the reproduced sound, and that the device can be made into a portable type easily portable to any desired place.

What I claim is:

1. A visual and aural type sound recording and reproducing device which makes use of a stationary record body, which comprises a casing, a main shaft adapted to rotate in said casing with a contant speed, a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, said rotating bodies being so constructed and arranged that they rotate in a completely balanced state at any inclined position.

2. A visual and aural type sound recording and reproducing device which makes use of a stationary record body, which comprises a casing, a main shaft adapted to rotate in said casing with a constant speed, a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, a balancing weight secured to the other end of said rotatable base plate and balancing the mass of the side portion of said rotatable base plate including said rotatable weight and pickup arm with respect to the center axis of the main shaft, said pickup arm being subjected to a rotating counter force so as to cancel the inside force acting upon said pickup arm during its scanning operation and to automatically return the pickup arm during its non-scanning operation to a position for starting the sound recording and reproduction.

3. A visual and aural type sound recording and reproducing device which makes use of a stationary record body, which comprises a casing, a main shaft adapted to rotate in said casing with a constant speed, a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, a balancing weight secured to the other end of said rotatable base plate and balancing the mass of the side portion of said rotatable base plate including said rotatable weight and pickup arm with respect to the center axis of said main shaft, a member for connecting said rotatable base plate and said main shaft being so constructed that said main shaft is slidable in the axial direction and the axial displacement of said rotatable base plate being so mechanically controlled that the scanning stylus can be lifted and lowered with respect to the record surface and that said scanning stylus can automatically be returned to the outside portion of the record surface when the stylus is lifted so as to repeatedly perform the sound recording and reproduction.

4. A visual and aural type sound recording and reproducing device which makes use of a stationary record body, which comprises a casing, a main shaft adapted to rotate in said casing with a constant speed, a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, a balancing weight secured to the other end of said rotatable base plate and balancing the mass of the side portion of said rotatable base plate including said rotatable weight and pickup arm with respect to the center axis of said main shaft, a cartridge pivoted to the end of said pickup arm such that said cartridge can be inclinable for a given angle, an electric circuit for the sound recording and reproducing device, a switch connected in said electric circuit, and an electromagnetic means for controlling the inclination of said cartridge in relation to the operation of said switch and effecting the lifting and lowering movements of said stylus with respect to said record surface.

5. A visual and aural type sound recording and reproducing device which makes use of a stationary record body, which comprises a casing, a main shaft adapted to rotate in said casing with a constant speed, a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, a balancing weight secured to the other end of said rotatable base plate and balancing the mass of the side portion of said rotatable base plate including said rotatable weight and pickup arm with respect to the center axis of said main shaft, a cartridge pivoted to the end of said pickup arm such that said cartridge can be inclinable for a given angle, a rotatable disc secured to the end of said main shaft, a curved groove formed in said rotatable disc and guiding the stylus, a latch secured to the inside part of said curved groove, and a projection secured to said cartridge and adapted to come into engagement with said latch so as to lock said cartridge to said rotatable disc.

6. A visual and aural type sound recording and reproducing device which makes use of a stationary record body, which comprises a vertical rectangular casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, and a transparent plate located in juxtaposed spaced relation to said scanning means, the space between said transparent plate and scanning means serving to receive said record body and which is then visible through said transparent plate.

7. A visual and aural type sound recording and reproducing device which makes use of a stationary record body which comprises a vertical rectangular casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight and, a balancing weight secured to the other end of said rotatable base plate and balancing the mass of the side portion of said rotatable base plate including said rotatable weight and pickup arm with respect to the center axis of said main shaft, a holding plate for holding said record body and arranged at the front of said casing in juxtaposed spaced relation to said scanning means, and means pivotally mounting said holding plate at its lower end to said casing such that the upper end can be opened and closed, said record body being insertable behind said holding plate adjacent said record scanning means so as to effect the sound recording and reproduction.

8. A visual and aural type sound recording and reproducing device which makes use of a stationary record body, which comprises a vertical rectangular casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight and, a balancing weight secured to the other end of said rotatable base plate and balancing the mass of the side portion of said rotatable base plate including said rotatable weight and pickup arm with respect to the center axis of said main shaft, a holding plate for holding said record body at the front of said casing in juxtaposed spaced relation to said scanning means, means pivotally mounting said holding plate at its lower end to said casing such that the upper end can be opened and closed, a sliding rod arranged at one side of the upper part of said casing and biased upwards by a spring, and a side plate connected to said holding plate and arranged to be engaged with a projection formed on said sliding rod, said projection and the engaging surface of said side plate being so related that when the holding plate is opened said projecting pin comes into engagement with a plane adapted to press downwards the sliding rod and that when the holding plate is closed said projecting pin comes into engagement with an upwardly extending slope which is continuous with said plane, and said holding plate being automatically opened when said sliding rod is pressed down and automatically locked when moved to its fully closed position.

9. A visual and aural type sound recording and reproducing device which makes use of a stationary record body, which comprises a vertical rectangular casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight and, a balancing weight secured to the other end of said rotatable base plate and balancing the mass of the side portion of said rotatable base plate including said rotatable weight and pickup arm with respect to the center axis of said main shaft, a holding plate for holding said record body arranged at the front of said casing in juxtaposed spaced relation to said scanning means, means pivotally mounting said holding plate at its lower end to said casing such that the upper end can be opened and closed, a lever having at its free end a pin projected sidewards from said free end and pivoted to the side wall of said casing, and a spring having one end connected to the free end of said lever and another end connected over the pivot of said lever to a point on the side wall of said casing, and an elongated slot formed on the side plate of said holding plate, said pin being loosely inserted in said elongated slot and said lever being rocked in one direction or other direction with respect to the dead point of the active line of said spring such that said holding plate can automatically be set to its open and closed positions.

10. A visual and aural type sound recording and reproducing device which makes use of a stationary record body, which comprises a vertical rectangular casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, a holding plate for holding said record body arranged at the front of said casing in juxtaposed spaced relation to said scanning means, means pivotally mounting said holding plate at its lower end to said casing such that the upper end can be opened and closed, and a switch adapted to be opened or closed in response to the closing and opening operations of said holding plate.

11. A visual and aural type sound recording and reproducing device which makes use of a stationary record body, which comprises a vertical rectangular casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, a holding plate for holding said record body and arranged at the front of said casing in juxtaposed spaced relation to said scanning means, means pivotally mounting said holding plate at its lower end to said casing such that the upper end can be opened and closed, and a contact resiliently projecting from said casing adjacent the outer peripheral portion of said scanning means to press the outer peripheral portion of the record body against said holding plate and lock the record body.

12. A visual and aural type sound recording and reproducing device which makes use of a stationary record body, which comprises a vertical rectangular casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, a holding plate for holding said record body and arranged at the front of said casing in juxtaposed spaced relation to said scanning means, means pivotally mounting said holding plate at its lower end to said casing such that the upper end can be opened and closed, and pins projected from the inner wall of said holding plate and supporting the outer peripheral edge of the record body inserted at the rear of said holding plate, the outer peripheral edges of said pins and of the record body being formed with indentations which prevent the record body from becoming rotatable.

13. A visual and aural type sound recording and reproducing device which makes use of a stationary record body, which comprises a vertical rectangular casing, a hollow main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, a holding plate for holding said record body at the front of said casing in juxtaposed spaced relation to said scanning means, means pivotally mounting said holding plate at its lower end to said casing such that the upper end can be opened and closed, pins projected from the inner wall of said holding plate and supporting the outer peripheral edge of the record body inserted at the rear of said holding plate, a stationary hollow shaft fitted in the center hole of said hollow main shaft, a movable shaft having at its end an end plate and arranged in said stationary hollow shaft, and a spring for pressing outwards said movable shaft to lock the center portion of the record body having no sound tracks against said holding plate.

14. A visual and aural type sound recording and reproducing device which makes use of a stationary record body having a center hole, which comprises a vertical rectangular casing, a hollow main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, a holding plate having a center hole for holding said record body and arranged at the front of said casing in juxtaposed spaced relation to said scanning means, means pivotally mounting said holding plate at its lower end to said casing such that the upper end can be opened and closed, pins projected from the inner wall of said holding plate and supporting the outer peripheral edge of the record body inserted at the rear of said holding plate, and a stationary shaft fitted in the center hole of said hollow main shaft and having a conical end adapted to be inserted into said center holes of the record body and of the holding plate, thereby effecting a fine centering between the record body and the sound recording and reproducing device.

15. A visual and aural type sound recording and reproducing device which makes use of a stationary record body, which comprises a casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, and an auxiliary weight secured to the opposite side of said rotatable weight and balancing the mass of said pickup arm with respect to the axis of said rotatable weight, a balancing weight secured to the other end of said rotatable base plate and balancing the mass of the side portion of said rotatable base plate including said rotatable weight and pickup arm with respect to the center axis of said main shaft, a holding plate having a center hole for holding said record body and arranged at the front of said casing in juxtaposed spaced relation to said scanning means, means pivotally mounting said holding plate at its lower end to said casing such that the upper end can be opened and closed, the end of said main shaft being extended through the center hole of said holding plate and constructed such that a turntable of a conventional record player can be connected to said end of the main shaft, and said casing being provided with a hole at one corner thereof adapted to receive the mounting shaft of a conventional pickup arm therein thereby to adapt said device for operation in conjunction with said turntable as a conventional record player.

16. A visual and aural type sound recording and reproducing device which makes use of a stationary record body, which comprises a casing, a main shaft adapted to rotate in said casing with a constant speed, record scanning means including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight, and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, a holding plate for holding said record body and arranged at the front of said casing in juxtaposed spaced relation to said scanning means, and means pivotally mounting said holding plate at its lower end to said casing such that the upper end can be opened and closed, said record body comprising a transparent plastic record surface and a printed surface adapted to be seen through said transparent plastic record surface.

17. A visual and aural type sound recording and reproducing device which makes use of a stationary record sheet containing a recording on one surface portion thereof and printed matter on another portion thereof, which comprises a casing, a main shaft adapted to rotate in said casing with a constant speed, scanning means for said recording including a rotatable base plate secured to said main shaft, a rotatable weight pivoted to one end of said base plate and adapted to rotate in parallel with the rotating surface of said base plate, a pickup arm projected from one side of said rotatable weight, an auxiliary weight secured to the opposite side of said rotatable weight and balancing the mass of said pickup arm with respect to the axis of said rotatable weight, and a balancing weight secured to the other end of said rotatable base plate and balancing the mass of the side portion of said rotatable base plate including said rotatable weight and pickup arm with respect to the center axis of said main shaft, said sound recording and reproducing device being placed on and covering only that portion of said record sheet provided with said recording thereby to maintain said record sheet stationary and with said recording and scanning means centered for reproducing the recording and also enable the printed matter on the other portion of said record sheet to be observed while said recording is being reproduced.

18. A visual and aural type sound recording and reproducing device comprising a vertical casing, said casing having mounted therein a base plate mounted for rotation about its center, a pickup arm pivotally supported on said rotatable base plate, said base plate and said pickup arm being rotatable in a completely balanced state in any attitude of said casing including the vertical position thereof, a record sheet holding plate pivotally secured to said casing at the lower end thereof, the record sheet being adapted to be placed between said holding plate and said pickup arm when said holding plate occupies its closed position on said casing, and said casing also including therein a centering shaft having a tapered head in axial alignment with the rotational axis of said base plate and said head being adapted to enter a hole in the center of said record sheet for centering the record trace with respect to the rotational axis of said base plate.

References Cited by the Examiner

UNITED STATES PATENTS

| | | | |
|---|---|---|---|
| 851,311 | 4/07 | Palmer | 274—9 |
| 2,293,220 | 8/42 | Rieber | 274—1 |
| 2,305,086 | 12/42 | Johnson | 274—14 |
| 2,478,538 | 8/49 | Leitner | 274—9 |
| 2,580,071 | 12/51 | Bunyard | 274—1 X |
| 3,074,724 | 1/63 | Fujimato | 274—9 X |

FOREIGN PATENTS

| | | |
|---|---|---|
| 494,986 | 4/50 | Belgium. |
| 892,686 | 3/62 | Great Britain. |

NORTON ANSHER, *Primary Examiner.*